Dec. 13, 1949  V. H. CHRISTEN  2,491,162
BATTERY FILLER PLUG
Filed Aug. 1, 1946
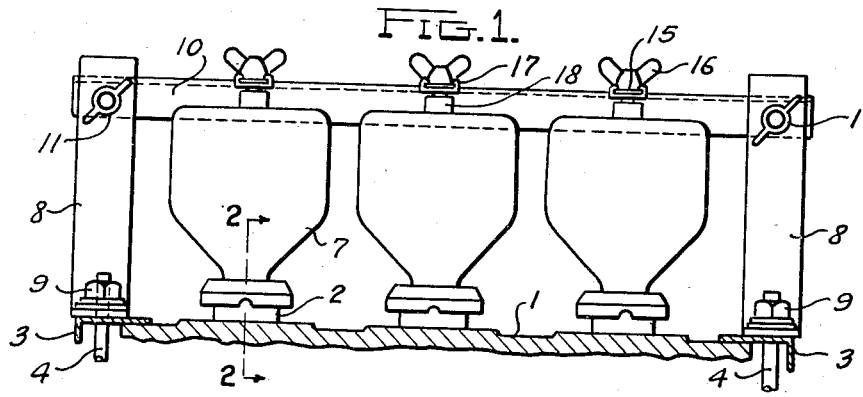
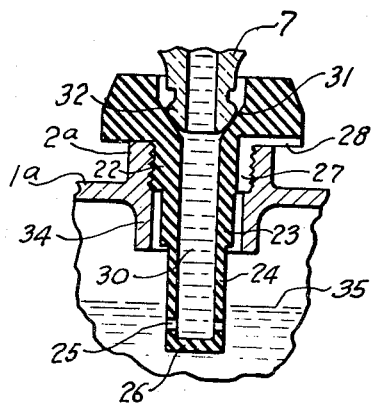
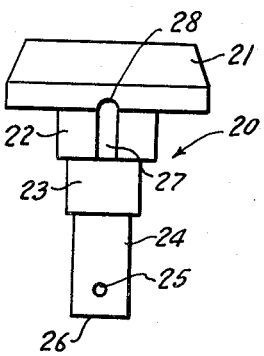
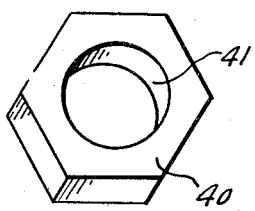
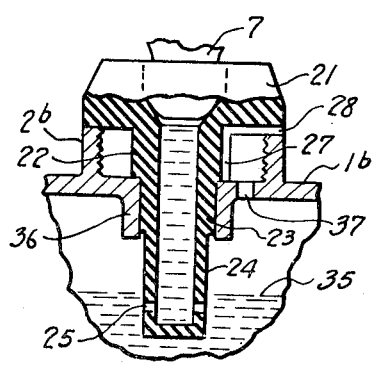
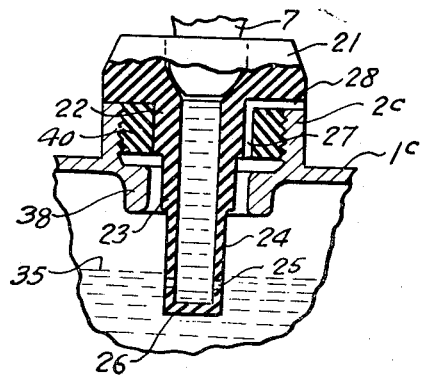
INVENTOR.
Victor H. Christen
BY
Barnes, Kisselle, Laughlin & Raisch
ATTORNEYS Patented Dec. 13, 1949

2,491,162

UNITED STATES PATENT OFFICE 2,491,162

BATTERY FILLER PLUG

Victor H. Christen, Sierra Madre, Calif.

Application August 1, 1946, Serial No. 687,669

1 Claim. (Cl. 136—162)

This invention relates to electrical storage batteries and it has to do particularly with improvements in means for maintaining a proper level of electrolyte in the cells of such batteries.

The invention finds its most usefulness in automobiles. It will be appreciated that batteries for automobiles are supplied by a number of manufacturers and the design and dimensions of some of the structural parts of the batteries are considerably varied. Now, in order to furnish apparatus for the application to batteries to maintain the electrolyte level, it is desirable that the apparatus properly function with various battery constructions. Accordingly, one object of the invention is to provide improvements in means for maintaining the electrolyte level in batteries which is applicable to and which will properly function with various battery constructions. Inasmuch as the filler openings of the batteries are involved when providing means to maintain the electrolyte level, it is a particular object of the invention to provide a closure piece or closure plug formed so that it will cooperate with a plurality of filler opening structures and dimensions. Other objects will be brought out as the following detailed description is considered.

Fig. 1 is a side elevational view, with some parts in section, showing electrolyte level maintaining apparatus applied to a three cell battery.

Fig. 2 is an enlarged sectional view taken substantially on line 2—2 of Fig. 1 illustrating one form of battery construction.

Fig. 3 is a side elevational view of the closure piece or plug.

Fig. 4 is a perspective view of an additional washer-like element.

Fig. 5 is a sectional view similar to Fig. 2 showing the closure piece or plug applied to a battery of different construction.

Fig. 6 is a view similar to Fig. 2 showing the closure piece applied to a still further type of construction.

The illustration in Fig. 1 shows the top portion 1 of a conventional three cell battery with each of the cells having a filler opening defined by a raised portion 2. The battery case or hold down means is illustrated at 3 which may engage the top of the battery and hold the same down by bolts 4.

The general construction of the apparatus may follow the type of construction shown in my copending application Serial No. 660,881, filed April 10, 1946, now Patent No. 2,471,094, in that each cell of the battery is provided with an inverted container or bottle 7 for containing water or electrolyte which is fed into the cells. My copending applications Serial No. 611,569, filed August 20, 1945, and Serial No. 750,801, filed May 27, 1947, now Patent No. 2,475,543, show somewhat similar closure members for battery cells. To support the bottles there are end brackets 8 held in position by the nuts 9 on the hold down bolts 4. Carried by the end brackets 8 is a cross support 10 which may be secured to the end brackets by winged nuts 11. Mounted on the support 10 for each cell is a spring arm 15. It will be understood that the support 10 may extend along a vertical side of the battery while the spring arms 15, which may be secured thereto by winged nuts 16 extend laterally so as to overlie the top of the battery and each spring arm has a fixture 17 slidable along the same for carrying a button or pressure device 18 for engaging the top of the inverted bottle. This structure is fully disclosed and claimed in the above mentioned application. It is not specifically claimed herein save for the fact, possibly, that the bottles are yieldably held downwardly.

The closure piece or plug is illustrated in Fig. 3. It comprises an integral body structure generally illustrated at 20. It has an enlarged top portion 21. The body member has a plurality of intermediate portions of different sizes, preferably of different diameters, and as shown herein the body has two of such portions. The upper portion as shown, is next adjacent the head 21 and is indicated at 22. The other portion is next adjacent the portion 22 but is of a size smaller than the portion 22 as indicated at 23. Depending from the portion 23 is a well portion 24 provided with one or more small apertures 25 and closed at its bottom as at 26. There is a vent groove, a portion of which at 27 is formed in the portion 22 and a portion of which 28 is formed in the underside of the head.

This plug or closure piece is of hollow construction, the hollow interior providing a passage or well 30. In the head 21, the interior is enlarged by means of inclined wall structure 31 and the container 7, which is inverted, has its neck portion extending into the enlargement. The glass or material about the mouth of the inverted bottle 7 is preferably formed on a curve as illustrated at 32 so as to seat upon the inclined walls 31 to provide an effective seal.

One battery construction is shown in Fig. 2. The top wall 1a is provided with an upstanding collar 2a. This is provided with internal threads for taking the usual cap (not shown) and it has a flange 34 extending into the cell. The electrolyte level is indicated at 35. With this form of battery construction, the portion 22 of the plug fits in the filler opening flange 2a. The portion 22 is not threaded but is merely shaped and sized so that it may be pushed into position. In this connection the entire body 20 may be made of a relatively soft plastic such as natural or synthetic rubber or other plastic, for that matter, and it needs no threaded engagement because it is held downwardly under the action of the spring 15. With this construction, it will be seen that the vent passages 27 and 28 form a vent for the cell.

A different battery construction is shown in Fig. 5 where the top wall of the battery is shown at 1b and the filler opening is defined by a collar or collet 2b which is threaded on its interior for receiving the usual manufacturer's cap. This battery construction has an opening defined by a flange 36 and a vent port 37 adjacent the same which connects the interior of the battery to the interior of the collet 2b. With a battery thus constructed the plug is positioned with the portion 23 fitting into the opening 36. Here again there is preferably a nice sliding fit so that the portion 23 may be pushed into the opening 36. The portion 22 is considerably smaller in diameter than the interior diameter of the collar 2b. The vent grooves 27 and 28 constitute a vent for the gases venting through the port 37.

Still another form of battery construction, as shown in Fig. 6, wherein the top of the battery 1c has a collect 2c with interior threads, but the collet 2c is too large for the portion 22. This battery also has another opening defined by a flange or collar 38 but it likewise is too large to fit the portion 23 of the plug. With this construction, a separate washer-like element 40 is employed as shown in Fig. 4. This washer-like part is preferably polygonal in exterior shape, such as the hexagonal shape illustrated, while the opening therethrough, as shown at 41, is designed to nicely fit the portion 22. Therefore, when the plug is to be applied to a battery of this construction, the washer 40 is first placed over the portion 22 and is then pushed into position within the collet 2c. The washer 40 is, like the plug, preferably made of a relatively soft plastic such as a natural or synthetic rubber and its corners frictionally engage within the collet 2c which is internally threaded for receiving the manufacturer's cap. The cell is vented, in this case, by the space of the portion 23 and the flange 38 and through the vent channels 27 and 28 or through the imperfect fit between the exterior of the washer 40 and the interior of the collet 2c or both. Where there is a variation in the interior diameter of the collet 2c, such as the one indicated in Fig. 6, the corners or hexagonal shaped washer may be trimmed off with a knife to make it fit.

The operation of the apparatus for maintaining the electrolyte level is substantially as follows: A normal condition with the battery in a static condition is substantially illustrated in Fig. 5. The well is of such dimensions that the liquid in the bottle gravitates into the same and fills the well. So long as electrolyte covers the ports 25 there is no flow of the electrolyte or water from the well into the cell. Some water may flow into the cell until there is a reduction of pressure of the liquid in the bottle. When the electrolyte lowers so as to expose an opening 25 air or gas may enter the exposed port and pass into the well, and this air will then bubble up through the well and into the bottle and into the space above the level of the water. This disturbs the equilibrium and displaced water will then flow through one or more of the ports 25 into the cell. If the battery remains in a static position the electrolyte will be maintained within close limits. But a vehicle, such as an automobile, is subjected to various jolts and jars, and centrifugal force in turning corners so that the level of an electrolyte does not remain static. Therefore, in going around a curve, for example, the electrolyte is disturbed and one or more of the ports 25 is exposed resulting in the flow of some liquid from the well into the cell. Accordingly, in an automotive vehicle, the normal static level of the electrolyte will be somewhat above the ports 25, as indicated in Figs. 2, 5 and 6. The dimension of the ports 25 is important in this connection that the electrolyte gives off gas which forms in bubbles and it is believed that the ports should be of such small size as to prevent passage of a bubble therethrough so long as the electrolyte level is above the ports with the liquid filling the ports. Thus, air or gas can enter the well only when the ports are uncovered.

I claim:

A closure member for the filler opening of a cell of an electric storage battery adapted for use with means for maintaining the level of electrolyte in the cell and with batteries having filler openings of varying structure and of varying sizes in the top wall thereof; said closure member comprising, a one-piece body of relatively soft plastic material having a relatively large head adapted to seat upon the material of the top of a battery surrounding a filler opening, a first portion immediately underlying the head and of cylindrical shape and of smaller diameter than the head for fitting within and against the internal walls of the filler opening of some of the batteries, a second portion immediately underlying said first portion and being of cylindrical shape and having a diameter less than that of the first portion for fitting within and against the internal walls of the filler opening on other batteries, and a well portion immediately underlying said second portion for extending into the cell of a battery, the head, the first and second portions and the well portion being hollow to provide a well formation extending through the closure member axially, the well portion having a bottom part for closing the bottom of the well and the top having an enlargement at the upper end of the well formation for receiving the open end of an inverted container.

VICTOR H. CHRISTEN.

REFERENCES CITED

The following references are of record in the file of this patent:

UNITED STATES PATENTS

| Number | Name | Date |
| --- | --- | --- |
| 1,329,917 | Marko | Feb. 3, 1920 |
| 1,373,472 | Weida | Apr. 5, 1921 |
| 1,736,116 | Ford | Nov. 19, 1929 |
| 1,898,718 | Dunzweiler | Feb. 21, 1933 |
| 1,978,449 | Codney | Oct. 30, 1934 |
| 2,139,476 | Townsend | Dec. 6, 1938 |

FOREIGN PATENTS

| Number | Country | Date |
| --- | --- | --- |
| 551,867 | Great Britain | Mar. 12, 1943 |